(12) United States Patent
Nogami et al.

(10) Patent No.: US 6,796,502 B2
(45) Date of Patent: Sep. 28, 2004

(54) ILLUMINATION APPARATUS AND IMAGE READING APPARATUS

(75) Inventors: Ryuji Nogami, Ibaraki (JP); Mitsugu Hanabusa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/360,154

(22) Filed: Feb. 6, 2003

(65) Prior Publication Data

US 2003/0150918 A1 Aug. 14, 2003

(30) Foreign Application Priority Data

Feb. 8, 2002 (JP) .................................... 2002-032717
Jun. 28, 2002 (JP) .................................... 2002-190128

(51) Int. Cl.[7] ................................ G06K 7/10; G06K 7/14
(52) U.S. Cl. ........................................................ 235/454
(58) Field of Search ................................ 235/454, 483, 235/491; 382/275, 312, 309, 260; 250/341.7, 330, 201.1

(56) References Cited

U.S. PATENT DOCUMENTS

| | | | | | |
|---|---|---|---|---|---|
| 5,266,805 A | * | 11/1993 | Edgar | .......................... | 250/330 |
| 5,546,496 A | * | 8/1996 | Kimoto et al. | .............. | 385/145 |
| 5,944,405 A | * | 8/1999 | Takeuchi et al. | .............. | 362/31 |
| 5,982,957 A | * | 11/1999 | DeCaro et al. | ............. | 382/312 |
| 6,101,273 A | * | 8/2000 | Matama | ....................... | 382/169 |
| 6,218,679 B1 | * | 4/2001 | Takahara et al. | .............. | 257/59 |
| 6,393,160 B1 | * | 5/2002 | Edgar | ......................... | 382/275 |
| 6,415,531 B1 | * | 7/2002 | Ohtsuki et al. | ................ | 36/31 |
| 6,552,778 B1 | * | 4/2003 | Konagaya | .................... | 355/71 |
| 2002/0131649 A1 | * | 9/2002 | Yamaguchi | ................. | 382/275 |
| 2002/0168116 A1 | * | 11/2002 | Takayama et al. | .......... | 382/275 |

FOREIGN PATENT DOCUMENTS

WO    WO 00/50807    8/2000

* cited by examiner

*Primary Examiner*—Thien M. Le
*Assistant Examiner*—Edwyn Labaze
(74) *Attorney, Agent, or Firm*—Morgan & Finnegan, L.L.P.

(57) ABSTRACT

In an image reading apparatus for reading a transparent original, the object of the present invention is to obtain a high-quality read image from which dust or scratch is removed. In order to achieve this object, in the image reading apparatus for reading the transparent original, a transparent original illumination unit has the first and second surfaces on the same side. On the first surface, at least one light source for emitting light in at least a visible range is arranged. On the second surface, at least one light source including a plurality of infrared light sources arrayed in series to emit light in an infrared range is arranged. The first and second surfaces are arranged at positions different from an effective light-emitting region, and includes a light guide plate and reflecting sheet for substantially uniformly emitting incident light from the same side portion to an entire surface.

39 Claims, 18 Drawing Sheets

ILLUMINATION APPARATUS AND IMAGE READING APPARATUS

FIELD OF THE INVENTION

The present invention relates to an image reading apparatus for reading image information of an original such as a photographic film and an illumination apparatus used in the image reading apparatus.

BACKGROUND OF THE INVENTION

When dirt such as dust exists on a transparent original or the surface of a photographic film is damaged (scratched), a conventional image reading apparatus for reading image information of the transparent original such as the photographic film reads even the dirt or scratch, so the image degrades owing to the dirt or scratch. In order to solve this problem, an image reading apparatus for correcting image information obtained by a visible light source by using dust/scratch information obtained by image information obtained by an infrared light source has been proposed (Japanese Patent Laid-Open No. 2001-298593). In this image reading apparatus, the visible light source serving as a surface light source such as a fluorescent lamp and the infrared point light source such as an infrared LED chip are arranged on the side surface of a light guide plate.

In the arrangement of the conventional image reading apparatus described above, however, even if light emitted by the visible light source is uniformly guided to an effective light-emitting surface region by a light guide member upon emitting light beams from the respective light sources, light emitted by the infrared light source cannot sufficiently diffuse since the infrared light source is too close to the effective light-emitting region. Hence, the original is non-uniformly irradiated, and the dust/scratch information cannot be accurately obtained.

Recently, along with the development of a communication network and the increases in speed of a computer and capacity of a storage medium, the color image information is required to be processed at a higher resolution. In particular, when color image information is read by a scanner and the like, a demand has arisen for reading the image more accurately at a higher speed and higher resolution.

When reading the image of the photographic film, a demand has arisen for reading the image information of the photographic film having a plurality of frames in a sleeve form more accurately at a higher speed and higher resolution. As a means for reading a film at a higher resolution, an image reading apparatus which has a means for removing the dust or scratch on the film is proposed. The above Japanese Patent Laid-Open No. 2001-298593 is an example of the image reading apparatus. According to this proposal, the light source including the infrared LED for detecting the dust/scratch information and the light source for reading the image information is arranged as a surface light source, so that the image in which the influence of the dust or scratch is reduced can be read.

The form of the image reading apparatus having the function of removing the dust or scratch on the film will be briefly described with reference to FIGS. 15, 16, and 17.

FIG. 15 is a schematic sectional view showing an example of an image input apparatus which can read both a reflecting original such as a document original and the transparent original such as the photographic film. FIG. 16 is a view showing an example of a transparent original light source unit used in the image input apparatus which has the function of removing the dust or scratch as described above.

A transparent original illumination apparatus 500 which is required for reading the transparent original such as the photographic film is arranged in an image reading apparatus 400, and electrically connected to the image reading apparatus 400 via a transparent original light source lighting inverter 507 and I/F cable 515 so as to be controllable from an image reading apparatus control board 503. The transparent original illumination apparatus 500 has a transparent original illumination unit 504 for reading the transparent original.

An optical unit 514 includes a first reflecting mirror 509, second reflecting mirror 510, third reflecting mirror 511, and lens 512 which are required for optically forming the image of the transparent original on a CCD image sensor 513, and a reflecting original illumination light source 508 for irradiating the reflecting original such as the document original, and reads the image while scanning the original in directions indicated by a double-headed arrow shown in FIG. 15 (in a subscanning direction) by the image input apparatus control board 503 and a motor 516.

The CCD image sensor 513 and image input apparatus control board 503 are electrically connected to each other via a signal cable 517. Hence, an electrical signal photoelectrically converted by the CCD image sensor 513 can be obtained as image data by scanning the original while synchronizing the transparent original illumination unit 504 and optical unit 514 by the motor 516.

A transparent plate 519 which exists between the transparent original illumination unit 504 and a film guide 505 on a document glass table 506 uses transparent glass or a diffusion member. As shown in FIG. 16, cold cathode fluorescent lamps (to be referred to as CCFLs hereinafter) 528 and infrared LED arrays 529 for reading the image information on the film original are arranged on the respective end faces in the transparent original illumination unit 504. Note that a reflecting sheet 532 and diffusion sheet 530 are effective to obtain the uniformities of light-emitting surfaces irradiated with respective light sources.

FIG. 17 is an enlarged view of a portion A in FIG. 16, and a schematic view of the light guide member pattern which is used to satisfy the uniformities of surface light sources when the CCFLs 528 and infrared LED arrays 529 are ON. FIG. 18 is a view showing that the incident light emitted by each CCFL 528 is reflected by the reflecting sheet 532, and diffused by a light guide member 531 having triangular grooves to illuminate the original. The taper angle or pitch of each triangular groove in the light guide member 531 is adjusted to obtain a diffusion effect, thereby obtaining the effect of the uniform surface light source. The influence of the dust or scratch can be removed, and a high-quality image can be read by scanning the original while line-sequentially or surface-sequentially switching the CCFLs 528 and infrared LED arrays 529.

In the arrangement of the triangular grooves such as the conventional transparent original light source unit 504 as described above, the uniformity can be obtained by the diffusion effect. However, there is room for improvement about high luminance and high power.

SUMMARY OF THE INVENTION

The present invention has been made in consideration of the above problem, and has as its object to provide a high-quality read image from which dust or scratches are removed in an image reading apparatus with a surface light source.

In order to solve the above problem, and achieve the object, according to the first aspect of the present invention, an illumination apparatus comprises a first light source which emits light in a visible range, a second light source which emits light in an invisible range, and a light guide plate which two-dimensionally guides for illumination light beams emitted by the first and second light sources, wherein a distance between an effective light-emitting region of the light guide plate and an arrangement portion of the first light source is different from a distance between the effective light-emitting region and an arrangement portion of the second light source.

According to the second aspect of the present invention, the illumination apparatus comprises a first light source which emits light in a visible range, a second light source which emits light in an invisible range, and a light guide plate which two-dimensionally guides for illumination light beams emitted by the first and second light sources, wherein a first reflecting surface which reflects irradiation light from the second light source into the light guide plate is arranged in the arrangement portion of the second light source.

According to the third aspect of the present invention, the illumination apparatus comprises a first light source which emits light in a visible range, a second light source which emits light in an invisible range, and a light guide plate which two-dimensionally guides for illumination light beams emitted by the first and second light sources, wherein the first and second light sources are juxtaposed along one side of the light guide plate, and a reflecting surface is arranged between the arrangement portions of the first and second light sources.

According to the fourth aspect of the present invention, an image reading apparatus including an original reading light source which illuminates an original, comprises a light guide member which diffuses light from the light source, a light source arranged near a side surface facing a side of a light-emitting surface of the light guide member, and a substantially flat reflecting member arranged on an upper portion of the light guide member to reflect light from the light source into the light guide member, and image reading means for reading an original image illuminated with light from the light source, wherein the light guide member has a plurality of substantially cylindrical grooves to focus the light on the light-emitting surface of the light guide member.

According to the fifth aspect of the present invention, an illumination unit comprises a light guide member which diffuses light, a plurality of cylindrical grooves which are formed in the light guide member, and have generating lines substantially extending in a direction perpendicular to a light-emitting surface, and first and second light sources with different characteristics, which are arranged on a side surface facing the light-emitting surface of the light guide member.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS (First Embodiment)

An image reading apparatus in an embodiment of the present invention will be described with reference to the accompanying drawings.

Figure 1:
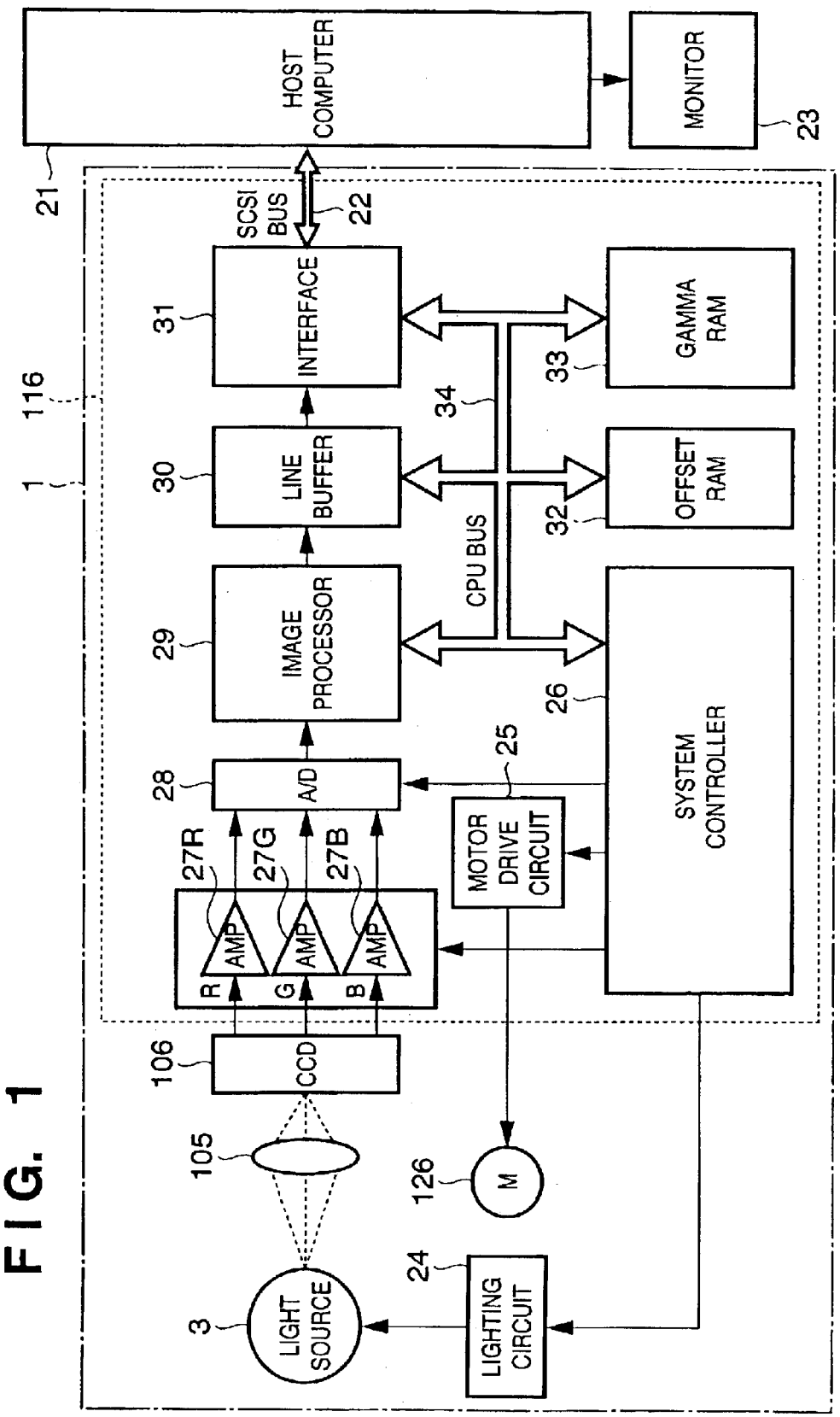
FIG. 1 is a block diagram showing the arrangement of an image reading apparatus according to embodiments.

FIG. 1 is a block diagram showing the internal arrangement of the image reading apparatus according to the first embodiment. An image reading apparatus 1 is connected to a host computer 21 via a signal cable. The image reading apparatus 1 operates to read an image in accordance with an instruction from the host computer 21, and transfers the image signal to the host computer 21.

Reference numeral 105 denotes an imaging lens for forming light from an original irradiated by a light source 3 into an image on a CCD line sensor 106 serving as a solid-state image sensing element; and 24, a light source lighting circuit for turning on the light source 3. Note that the image sensing element may be a CMOS sensor or the like other than the CCD line sensor. Reference numeral 25 denotes a motor drive circuit arranged on an electric board 116 to drive a pulse motor 126 and output an excitation switching signal for the pulse motor 126 upon reception of a signal from a system controller 26 serving as the system control means of the image reading apparatus (image scanner) 1; and 27R, 27G, and 27B, analog gain adjusters for variously amplifying analog image signals output from the CCD line sensor 106.

Reference numeral 28 denotes an A/D converter for converting analog image signals output from the analog gain adjusters 27R, 27G, and 27B into digital image signals; 29, an image processor for performing image processing such as offset correction, shading correction, digital gain adjustment, color balance adjustment, masking, resolution conversion in the main scanning and subscanning directions, and dust/scratch correction (to be described later) to a digital image signal; and 30, a line buffer which temporarily stores image data and is implemented by a general-purpose random access memory.

Reference numeral 31 denotes an interface for communicating with the host 21. In the first embodiment, the interface 31 is implemented by a SCSI controller but may adopt another interface such as a centronics or USB interface. Reference numeral 32 denotes an offset RAM used as a working area in image processing. The offset RAM 32 is used to correct offsets between R, G, and B lines because the line sensor 106 is constituted by parallel-arranging R, G, and B line sensors with predetermined offsets. The offset RAM 32 also temporarily stores various data for shading correction and the like. In the first embodiment, the offset RAM 32 is implemented by a general-purpose random access memory.

Reference numeral 33 denotes a gamma RAM for storing a gamma curve for gamma correction. The system controller 26 stores the sequence of the overall scanner as a program, and executes various control processes in accordance with instructions from the host 21. Reference numeral 34 denotes a system bus which connects the system controller 26 to the image processor 29, line buffer 30, interface 31, offset RAM 32, and gamma RAM 33, and is made up of address and data buses.

Figure 2:
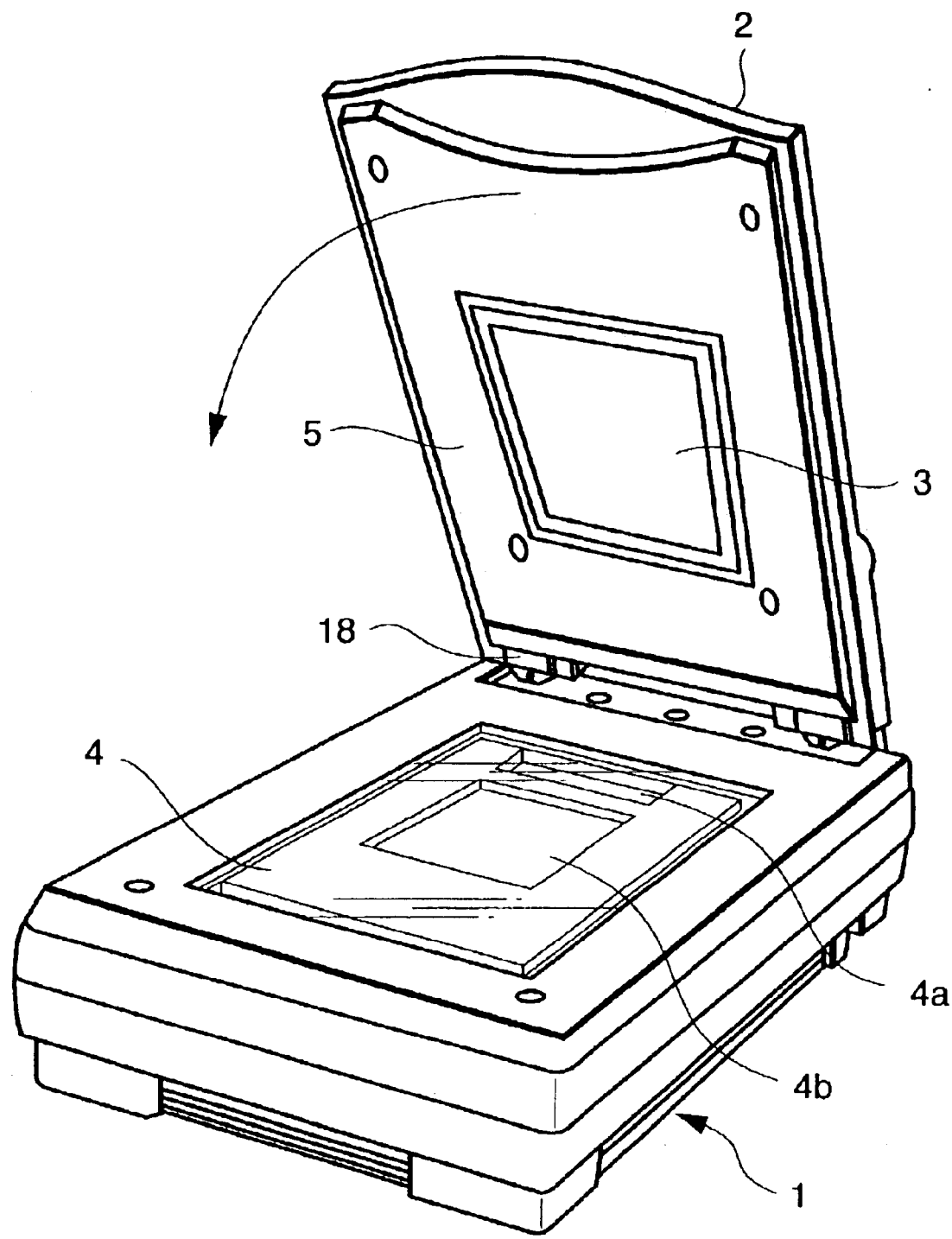
FIG. 2 is a schematic perspective view of the image reading apparatus according to the embodiments.

FIG. 2 is a schematic perspective view showing the image reading apparatus according to the first embodiment. As shown in FIG. 2, a transmission illumination unit 2 for illuminating a transparent original in reading the transparent original such as a developed photographic film is pivotally attached to the image reading apparatus 1 via hinges 18. The transmission illumination unit 2 is attached by fixing the surface light source 3 (to be described later) to a lower unit cover 5 with a screw or the like. The surface light source 3 is protected with a transparent member for protecting a light source.

The main body of the image reading apparatus 1 is equipped with a platen glass 13 for setting an original to be read. To read a photographic film, a light-shielding sheet 4 is set on the platen glass 13. A shading window 4a of the light-shielding sheet 4 is to measure shading, and a transparent original setting portion 4b is a location where a transparent original is set.

Figure 3:
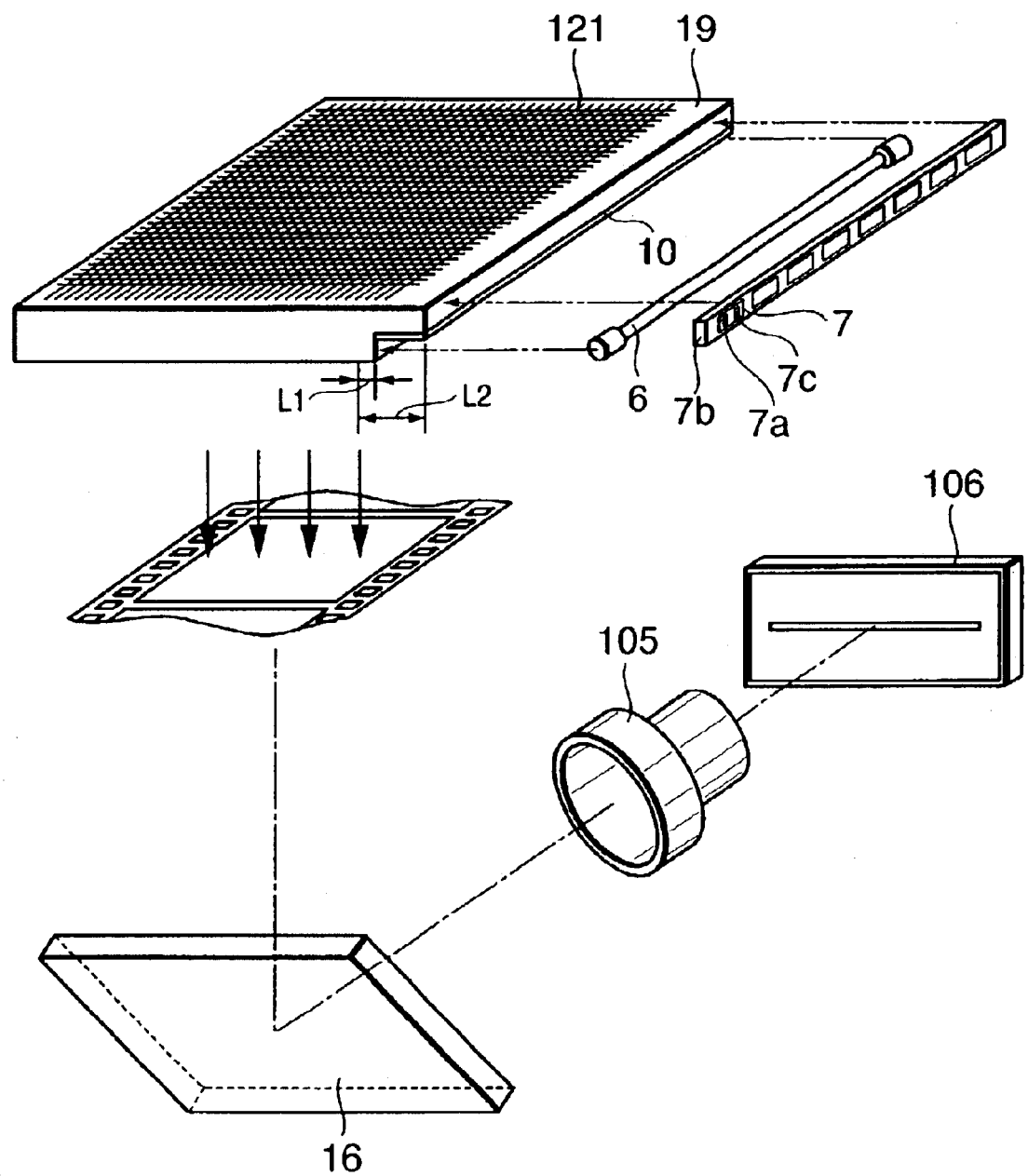
FIG. 3 is a schematic perspective view of a transparent illumination unit according to the first embodiment.
Figure 4:
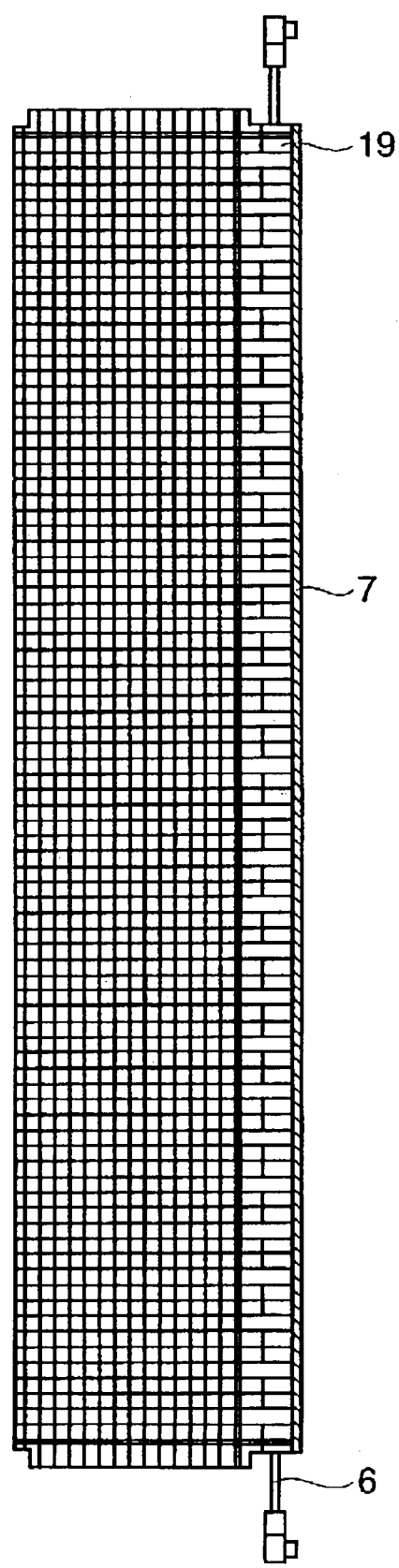
FIG. 4 is a schematic plan view of the transparent illumination unit according to the first embodiment.

FIG. 3 is a schematic perspective view showing that the transparent original illuminated by the transparent illumination unit is read. FIG. 4 is a plan view of the surface light source 3. The surface light source 3 is constituted by a light guide plate 19, transparent original reading lamps 6 such as fluorescent lamps or xenon lamps which mainly irradiate the original with light in a visible range, and dust/scratch detection lamps 7 formed from LEDs mainly having an emission intensity only in the infrared range.

Each transparent original reading lamp 6 is arranged at an end face separated by L1 from an effective light-emitting region end portion for two-dimensionally illuminating the transparent original by the surface light source 3. Each dust/scratch detection lamp 7 is arranged at an end face separated by L2 from the effective light-emitting region end portion. In the first embodiment, the distance L2 between the lamp 7 and the end face is longer than the distance L1 between the lamp 6 and the end face.

The light guide plate 19 is a resin diffusion panel constituted by a light guide portion 11 for guiding illumination light L in the two-dimensional longitudinal direction by internal reflection, a reflecting sheet portion 10 for reflecting in the original direction the light guided by the light guide portion 11, and a diffusion sheet portion 12 for making the light reflected by the reflecting sheet portion 10 uniform. A light guide pattern 121 is formed in the light guide portion 11 by the plurality of grooves for substantially two-dimensionally guiding and emitting the incident light.

Figure 5:
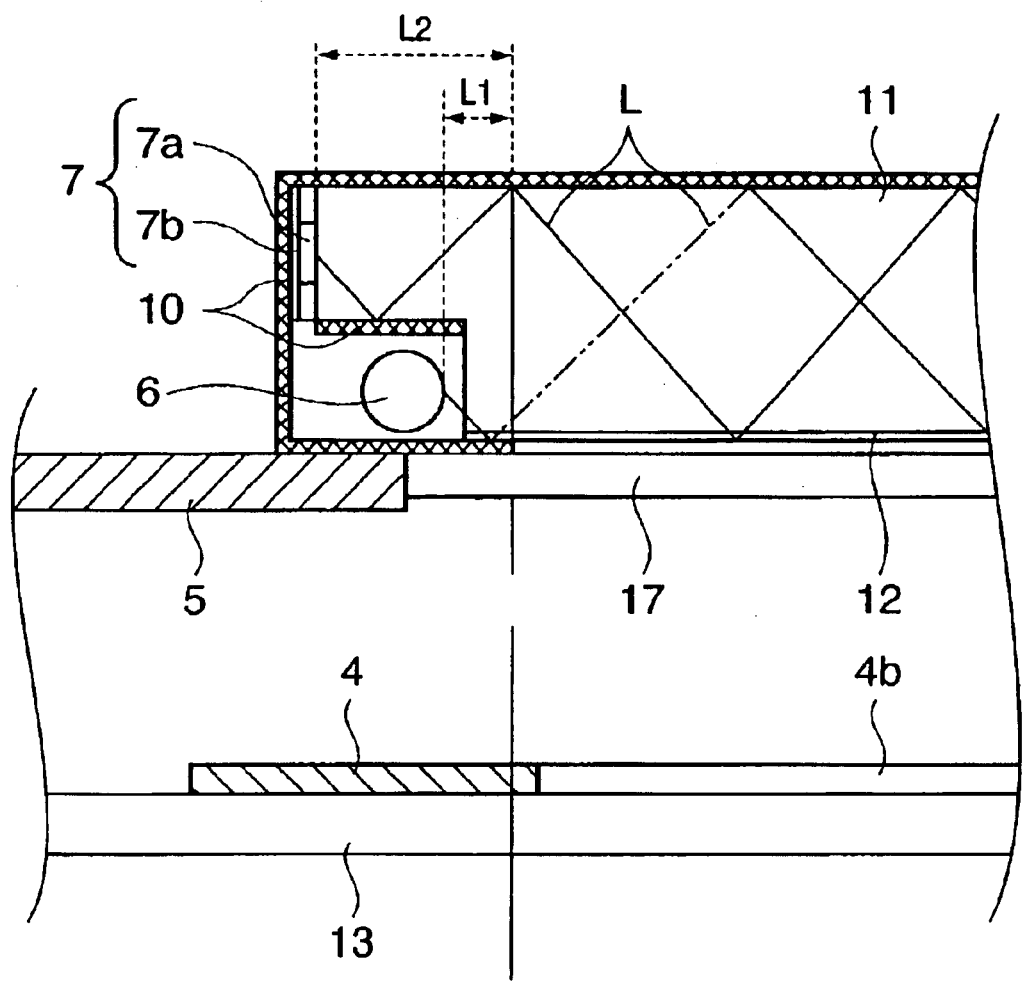
FIG. 5 is a schematic sectional view of an image reading apparatus according to the first embodiment.

As shown in FIG. 5, the reflecting sheet portion 10 is arranged along the outer surface of the light guide portion 11. The end of the reflecting sheet portion 10 covering the light-emitting surface side of the light guide member is extended close to the effective light-emitting region for irradiating the transparent original image region so as to prevent light from the transparent original reading lamp 6 and dust/scratch detection lamp 7 from directly irradiating the image reading region. The entire surface of the light guide member 19 can more uniformly emit light.

In the first embodiment, the reflecting sheet 10 is arranged not only on the outer surface of the light guide portion 11 but also between the arrangement portions of the transparent original reading lamp 6 and dust/scratch detection lamp 7. The infrared light emitted by the dust/scratch detection lamp 7 can be efficiently guided into the light guide portion 11 along its longitudinal direction. Note that the light guide portion 11 may be coated or printed with reflecting paint in place of arranging the reflecting sheet. The light beams L emitted by the transparent original reading lamp 6 and dust/scratch detection lamp 7 propagate through the light guide portion 11 in the two-dimensional longitudinal direction while being reflected between the reflecting sheet portion 10 and the diffusion sheet portion 12. Part of the light incident on the diffusion sheet portion 12 diffuses, and the entire surface of the light guide plate 19 uniformly emits light.

Each dust/scratch detection lamp 7 is formed from a plurality of infrared LED chips 7a and an LED substrate 7b having light-emitting apertures 7c at positions corresponding to the infrared LED chips 7a. Each infrared LED chip 7a is arranged such that the light-emitting portion of the infrared LED chip 7a is fitted in the LED aperture 7c of the LED substrate 7b from a side opposite to the light guide member facing surface of the LED substrate 7b. The light guide member facing surface of the LED substrate 7b is flat. The light guide member facing surface of the LED substrate 7b is coated or printed with white paint to form a reflecting surface. Hence, light emitted by the LED chip 7a is efficiently reflected into the light guide portion 7. This can increase the infrared luminance of the entire surface light source 3. Each dust/scratch detection lamp 7 is tightly fixed to an end face of the light guide portion 11 by covering the lamp 7 with a reflecting sheet portion 10. Hence, infrared rays emitted by the dust/scratch detection lamps 7 can be efficiently guided into the light guide member.

Figure 6:
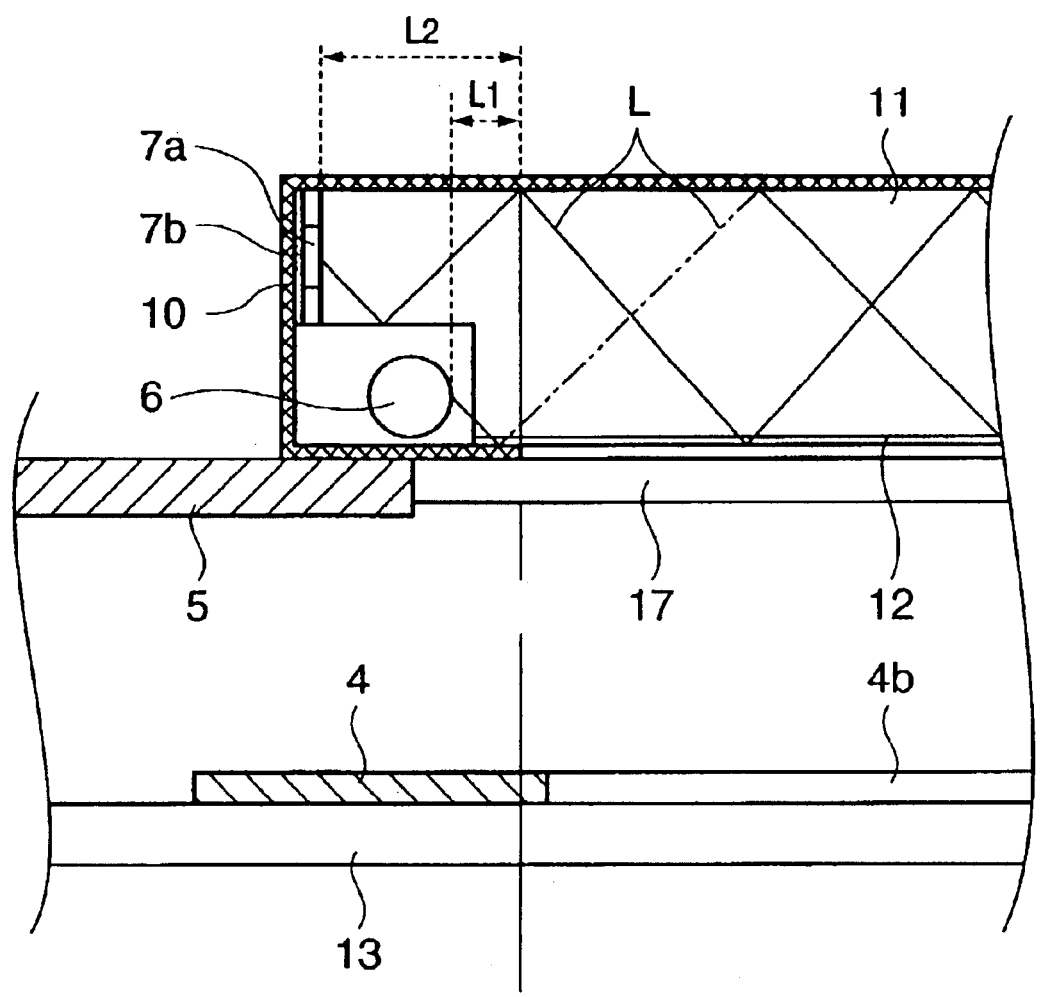
FIG. 6 is a schematic sectional view of the image reading apparatus according to the first embodiment.

Each transparent original illumination lamp 6 may emit light only in the visible range. However, the transparent original illumination lamp 6 may irradiate the original with light in the invisible range such as an infrared range as far as light in the visible range mainly irradiates the original. The dust/scratch detection lamp 7 need not emit only light in the infrared range as far as light in the infrared range is mainly emitted. Additionally, the dust/scratch detection lamp 7 may use a fluorescent lamp, xenon lamp, or light source other than the LED. As shown in FIG. 6, the reflecting sheet portion 10 need not be set between the transparent original reading lamp 6 and the LED substrate 7b of the dust/scratch detection light source 7. This reduces a manufacturing cost as compared with that of the apparatus with the reflecting sheet portion 10.

Figure 7:
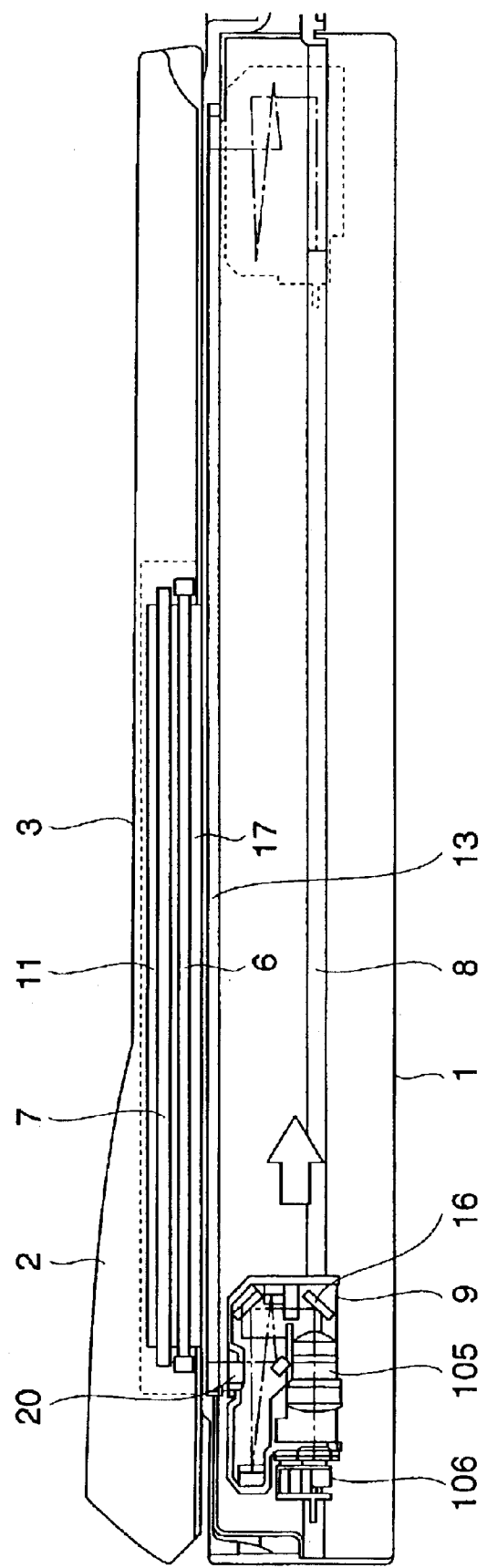
FIG. 7 is a schematic sectional view of a transparent illumination unit according to the first and second embodiments.

FIG. 7 is a sectional view showing the image reading apparatus according to this embodiment. A carriage 9 of the image reading apparatus 1 supports a reflecting original illumination lamp 20, the CCD line sensor 106, the lens 105, and a reflecting mirror 16. The CCD line sensor 106 converts an image into an electrical image signal, and is constituted by a plurality of image sensing elements aligned in a line. The carriage 9 is fitted on a carriage guide shaft 8 and is movable in the subscanning direction.

Transparent original reading operation will be described below. The reflecting original illumination lamp 20 and dust/scratch detection lamps 7 are turned off, and the transparent original lamps 6 are turned on. Then, the whole surface light source 3 emits light. The carriage 9 is moved in the subscanning direction to project image information on a transparent original onto the CCD line sensor 106 via the reflecting mirror 16 and lens 105.

The reflecting original illumination lamp 20 and transparent original illumination lamps 6 are turned off, and the dust/scratch detection lamps 7 are turned on. Then, the whole surface light source 3 emits light. The carriage 9 is moved in the subscanning direction to project dust, a scratch, or the like on the transparent original onto the CCD line sensor 106 via the reflecting mirror 16 and lens 105. Since light from the dust/scratch detection lamp 7 contains only infrared components, the transparent original such as a negative or positive film transmits the infrared components regardless of the image (photosensitive image). An image of dust, a scratch, or the like which physically intercepts the optical path is projected as a shadow on the CCD line sensor 106. The dust or scratch can be accurately detected.

Both the dust/scratch detection image and the read image of the transparent original undergo image processing (dust/scratch correction processing) in the image processor 29. The defective region having the dust or scratch recognized on the dust/scratch detection image is interpolated from the ambient original-read image. A high-quality transparent original image free from the influence of the dust or scratch can be read.

(Second Embodiment)

Figure 8:
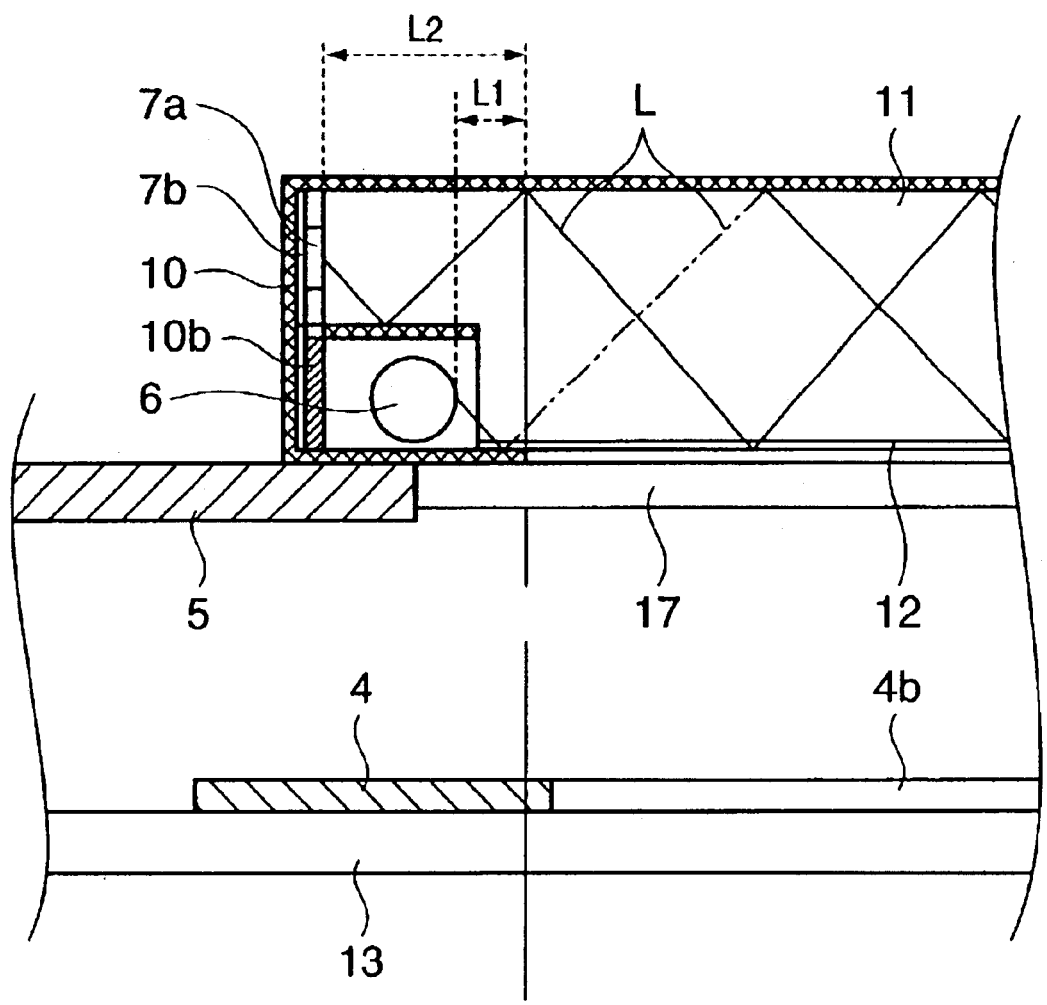
FIG. 8 is a schematic sectional view of an image reading apparatus according to the second embodiment.

FIG. 8 is a sectional view of an image reading apparatus in the second embodiment of the present invention. An LED substrate 7b with the height of the side surface of a light guide portion 11 is arranged, and a reflecting sheet 10b is arranged on the LED substrate 7b on the side of a transparent original irradiation lamp 6. In this arrangement, workability of mounting infrared LED chips 7a on the LED substrate 7b, strength of the LED substrate 7b, and luminance of the irradiation light from the transparent original irradiation lamp 6 can be increased.

As described above, according to the first and second embodiments, the image reading apparatus using the surface light source can attain a high-quality read image from which dust or scratches are effectively removed.

(Third Embodiment)

Figure 9:
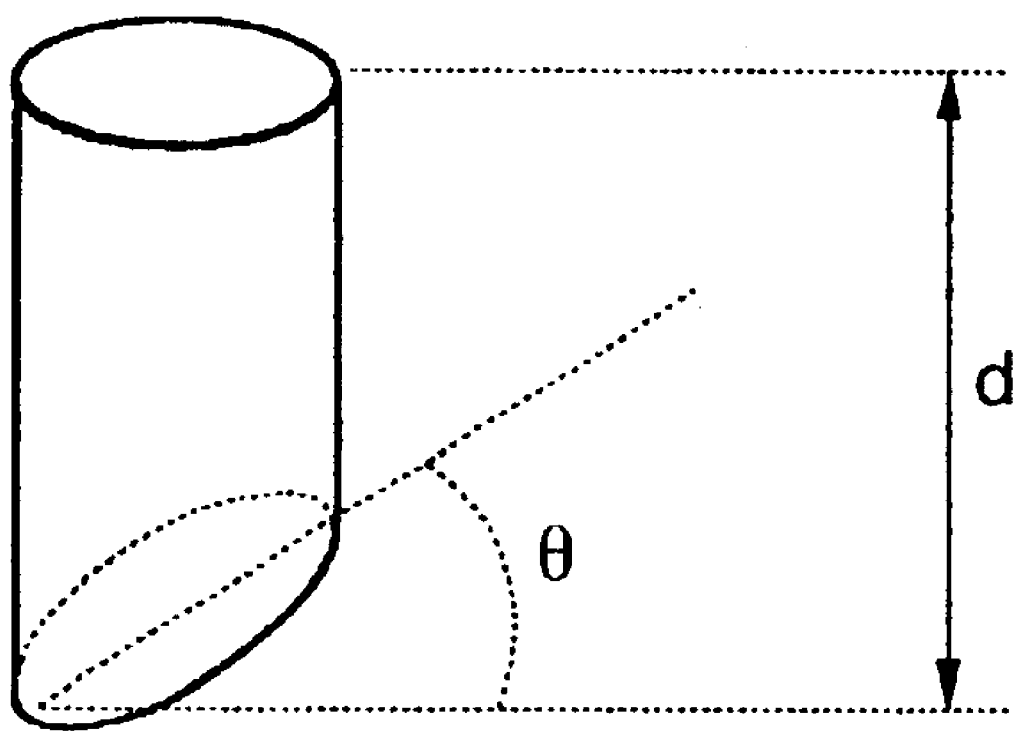
FIG. 9 is a view showing the form of a lens-like groove in the third embodiment of the present invention.
Figure 10:
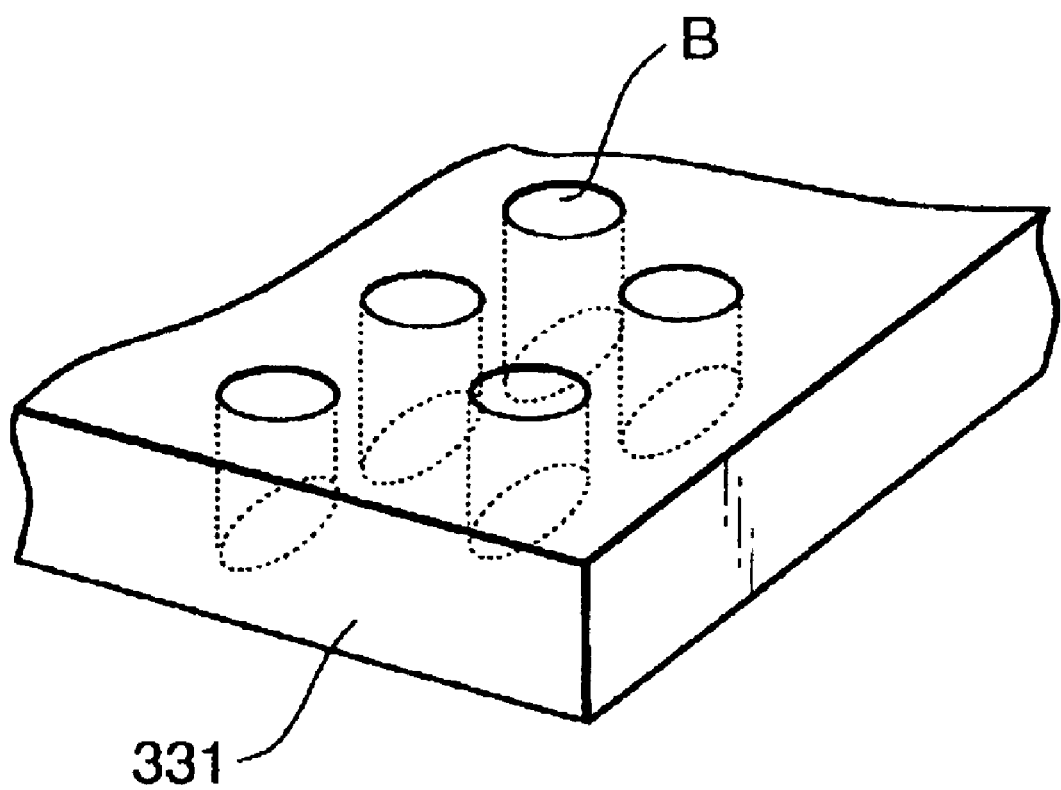
FIG. 10 is an enlarged view of a light guide member in the third embodiment of the present invention.

FIG. 9 is a view showing a substantially circular-cylindrical lens-like groove with a depth d which has a taper angle θ at an end and a condensing effect. FIG. 10 is a view showing a state in which the lens-like grooves B shown in FIG. 9 are formed on a light guide member 331 (corresponding to the light guide member 531 in FIG. 16).

As illustrated in FIG. 9, the light guide member 331 has many cylindrical grooves with generating lines substantially extending in a direction perpendicular to the light-emitting surface.

Figure 11:
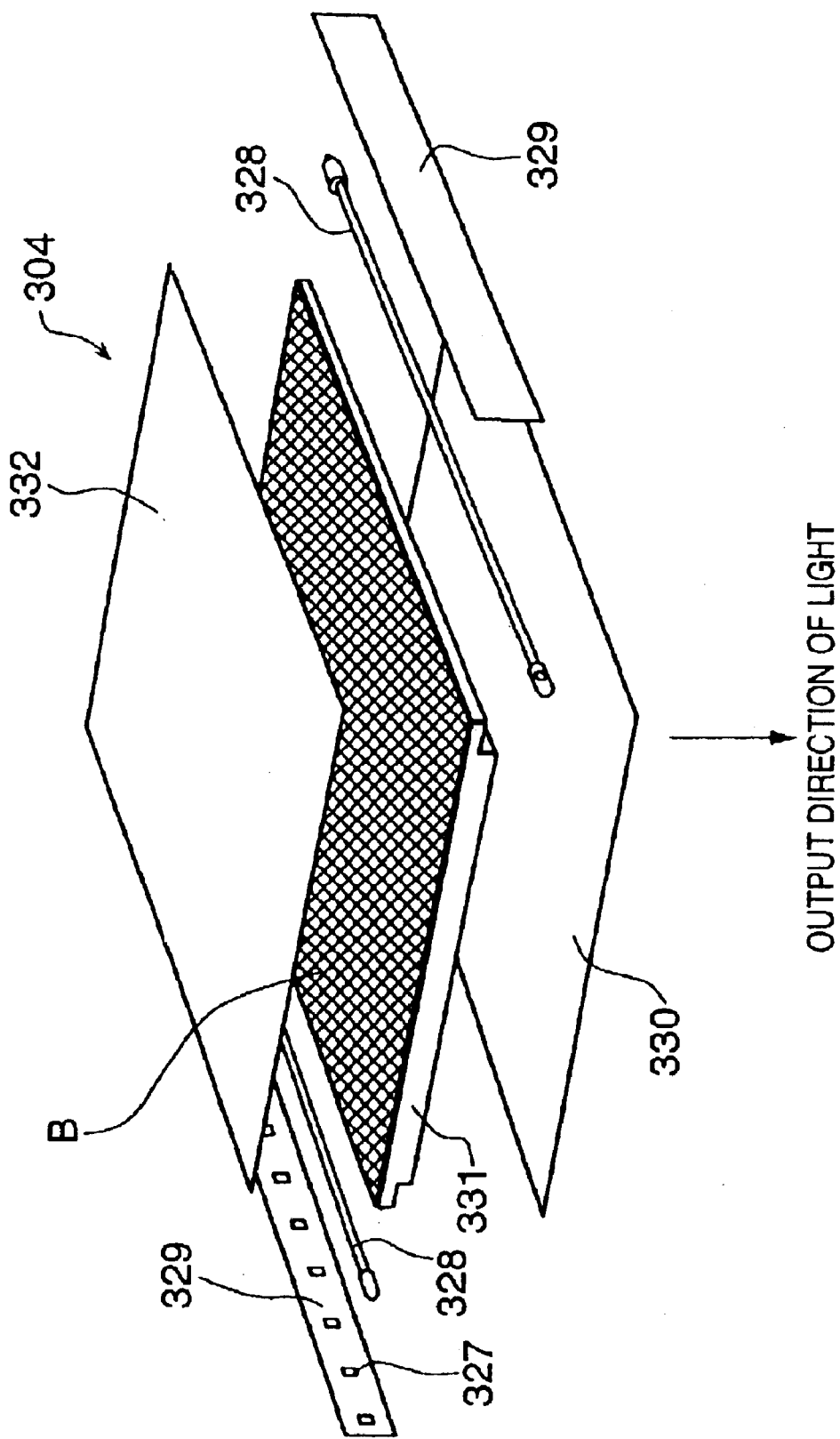
FIG. 11 is a view showing a transparent original light source unit in the third embodiment of the present invention.
Figure 16:
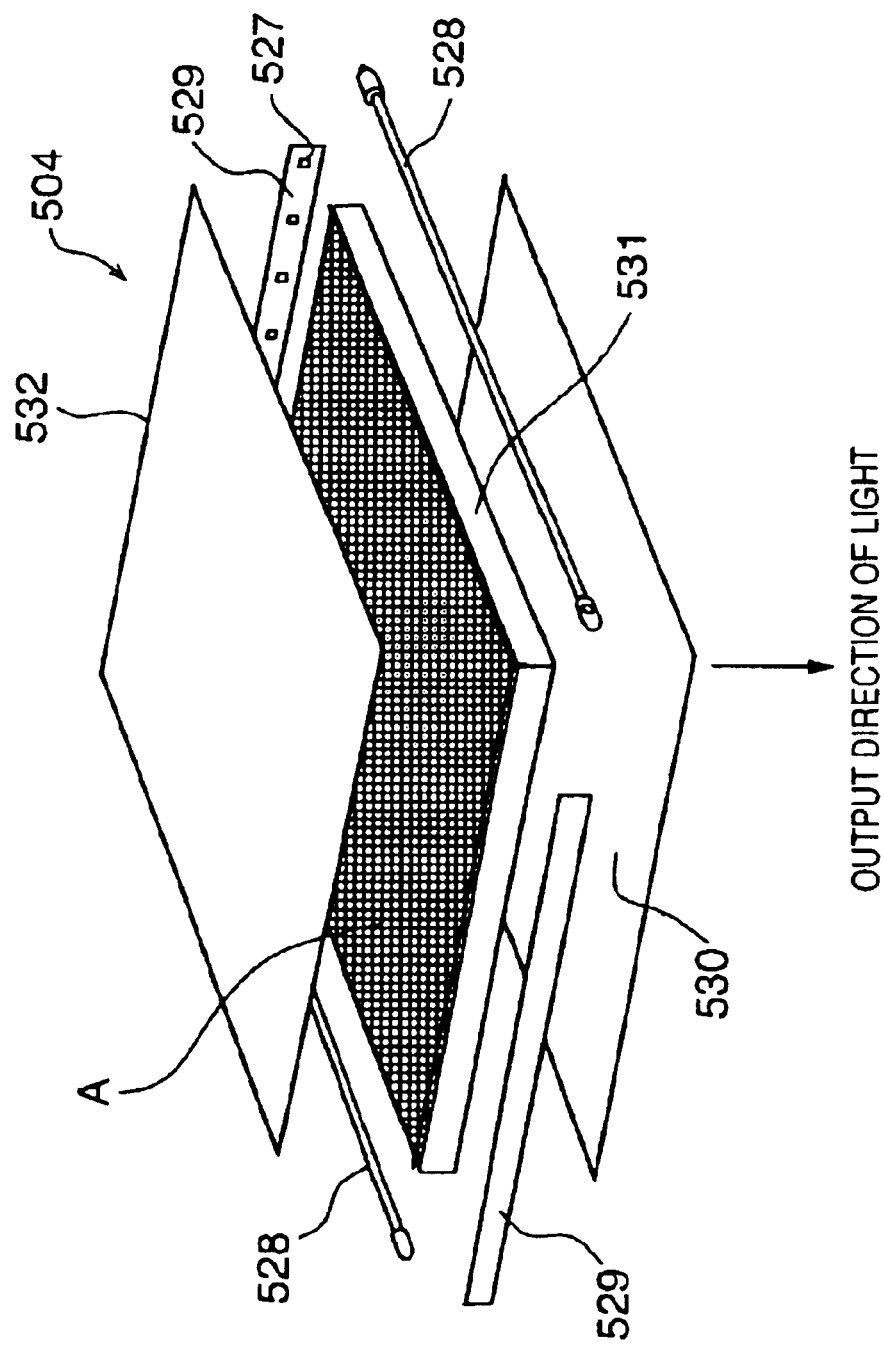
FIG. 16 is a view showing the arrangement of a conventional transparent original light source unit.
Figure 17:
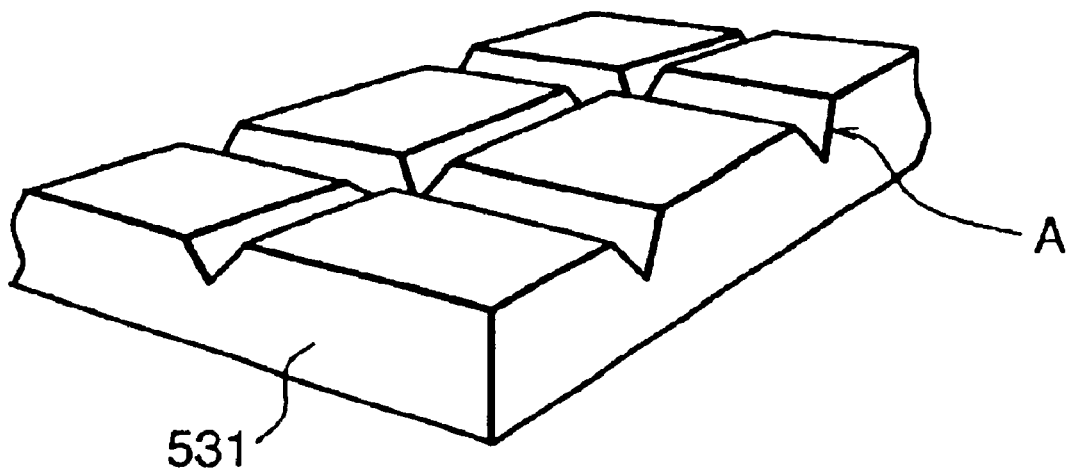
FIG. 17 is an enlarged view of a conventional light guide member.
Figure 18:
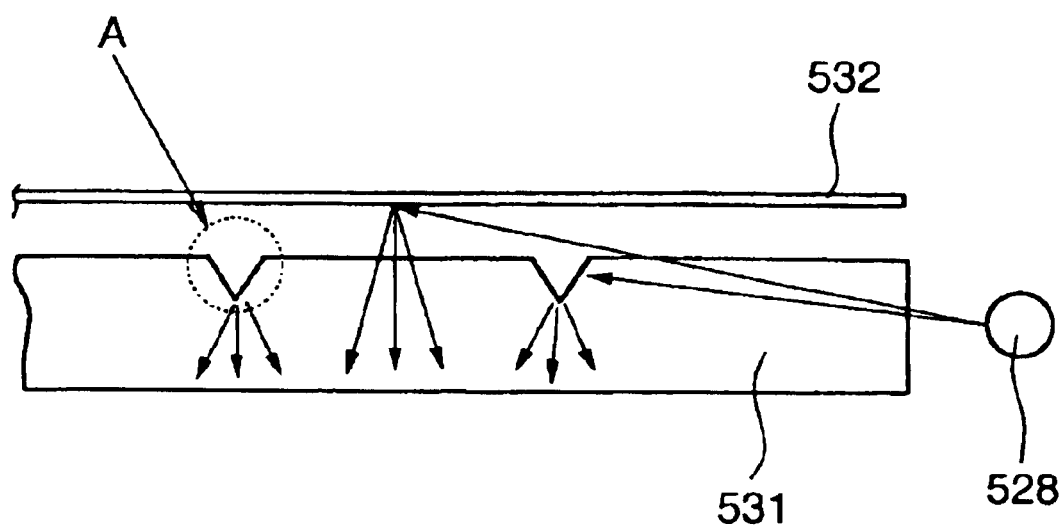
FIG. 18 is a view for explaining a conventional luminous efficiency.

FIG. 11 is a view showing an example of a transparent original light source unit 304 (corresponding to the transparent original light source unit in FIG. 16) which includes the light guide member 331 with the lens-like grooves B shown in FIG. 9, and can remove the influence of the dust or scratch.

The transparent original light source unit 304 includes CCFLs 328 serving as the second light sources for reading the image information of a film original, and infrared LED arrays 329 serving as the first light sources. The pair of the first and second light sources are juxtaposed on each of the end faces. Each second light source has a fluorescent member, and emits light in the longitudinal direction. Each first light source has a plurality of light-emitting surfaces in the longitudinal direction. Hence, in the first light source, light-emitting surfaces 327 are intermittently arranged as compared with the second light source, and the area of the light-emitting surfaces 327 is smaller than that of the second light source. Therefore, the first and second light sources have different spectral characteristics in the longitudinal direction. Note that a reflecting sheet 332 and diffusion sheet 330 are effective members for obtaining the uniformities of the light-emitting surfaces by the respective light sources. In the transparent original light source unit 304 arranged as shown in FIG. 10, the incident light beams emitted by the CCFL 328 and infrared LED array 329 can be used in both the light sources with high efficiency. Note that, in the second embodiment, the CCFL is used as the light source for reading the film original. However, a white light source formed from another LED or the like, or an LED light source or the like which emits visible light in another color may be used.

Figure 12:
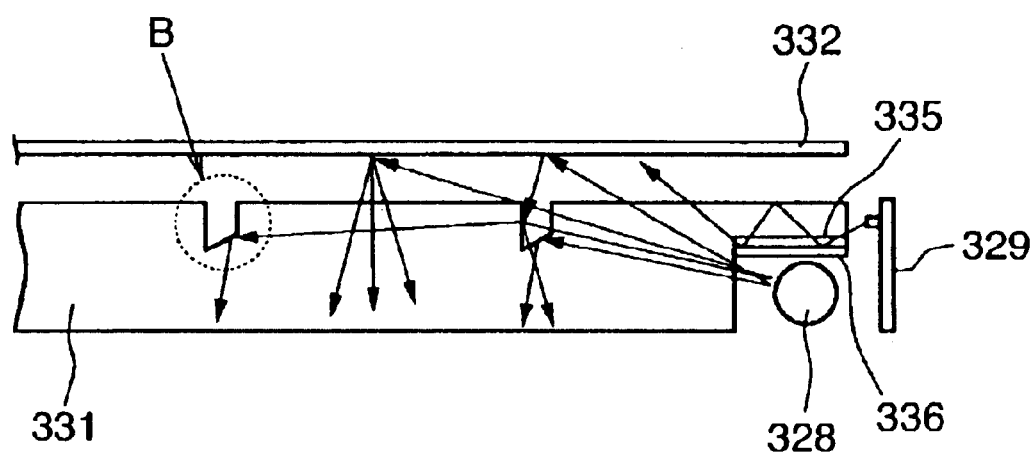
FIG. 12 is a view for explaining a luminous efficiency in the third embodiment of the present invention.

FIG. 12 is a schematic view showing the state of its efficiency.

In FIG. 12, the incident light emitted by the CCFL 328 is reflected by the reflecting sheet 332, and is emitted from the surface while being condensed by the lens-like grooves B in FIG. 9. As described above, in the first light source 329, the light-emitting surfaces 327 are intermittently arranged as compared with the second light source 328. Therefore, as shown in FIG. 12, the first light source 329 is arranged at a position outside the second light source 328, so that the longitudinal light distributions of the light beams from the first and second light sources come close to each other in making the light beams impinge on the light guide member. Since the first light source 329 is arranged at the position outside the second light source 328, a light-shielding member 335 is arranged so as not to leak light from the first light source 329, and a reflecting member 336 is arranged on the second light source side.

The taper angle θ, depth d, direction of the taper angle, and positions of the grooves can be freely set in accordance with the positions of the light sources, the size of the light guide member, and the like. The taper angle is set so as to efficiently reflect and condense light on the light-emitting surface of the light guide member 331 in correspondence with the incident light beams from the light sources 328 and 329. Accordingly, the taper angle θ and depth d are set in accordance with the respective incident angles of the light sources 328 and 329 which are arranged to face each other as shown in FIG. 11. Hence, a more preferable pattern can be designed as compared with the conventional shape of triangular grooves, and even incident light from the infrared LED array 329 can be used at high efficiency. Therefore, in the image reading apparatus having the transparent original light source unit in this embodiment, the homogeneity of the light amount distribution as the surface light source for reading the original and the uniformity of the light amount distribution as the surface light source for detecting dust or scratch can be implemented at high efficiency. Hence, the light-emitting surface can emit light at high luminance, high power, and high speed. Therefore, the image reading apparatus with the dust/scratch removing function of realizing the high-quality image obtained by the first image signal corresponding to the first light sources 329 and the second image signal corresponding to the second light sources 328 can be implemented.

<Removing Dust or Scratch>

Figure 15:
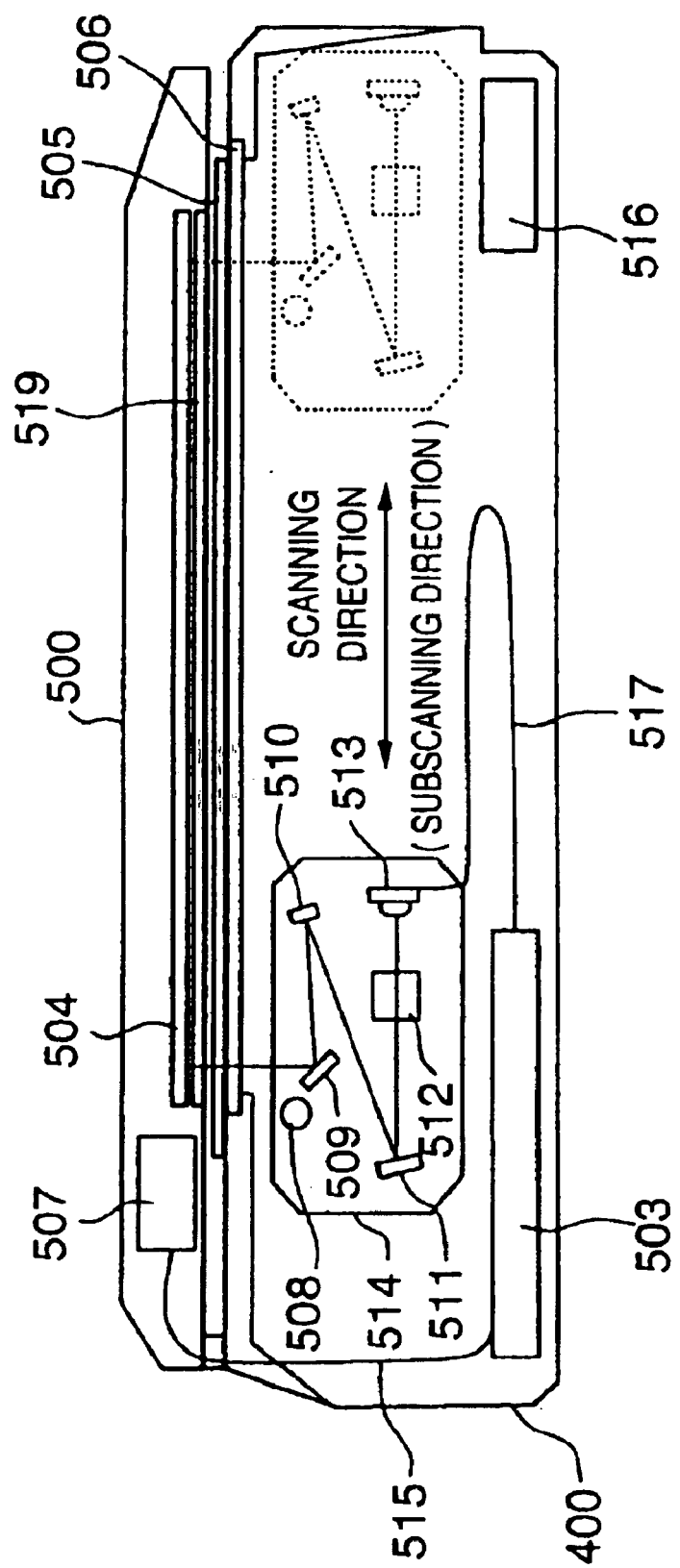
FIG. 15 is a view showing a conventional image reading apparatus.

Reading operation for a high-quality image from which the influence of dust or scratch is removed by using the high-quality image signal obtained for removing the dust or scratch will be described below. Note that the following operation is executed in a signal processing circuit in accordance with an instruction from an information processing means such as a CPU (not shown) on the image reading apparatus control board (corresponding to the apparatus control board 503 in FIG. 15).

The information of the dust or scratch on the film is reflected on the image information obtained by irradiating the film with light from the infrared LED array 329. The cyan, yellow, and magenta portions of a general negative or positive color film can transmit infrared light at high transmittances. Therefore, the film transmits most of light from the infrared light LED array 329 regardless of the image on the film. When there is dust or scratch, the film does not transmit light. Hence, when there is dust or scratch, the information on which the image of dust or scratch is reflected can be obtained regardless of the image on the film.

On the other hand, the information of dust or scratch on the film is reflected on the image information obtained by irradiating the film with light from the CCFL 328, and the image information on which the image on the film is also reflected can be obtained.

The pieces of image information obtained by irradiating the film with light beams from the infrared LED array 329 and CCFL 328 are compared and processed, thereby reading the high-quality image from which the influence of dust or scratches is removed.

Note that the original serving as a subject is fixed to be read in this embodiment. However, scanning operation may be performed by moving the subject.

(Fourth Embodiment)

Figure 13:
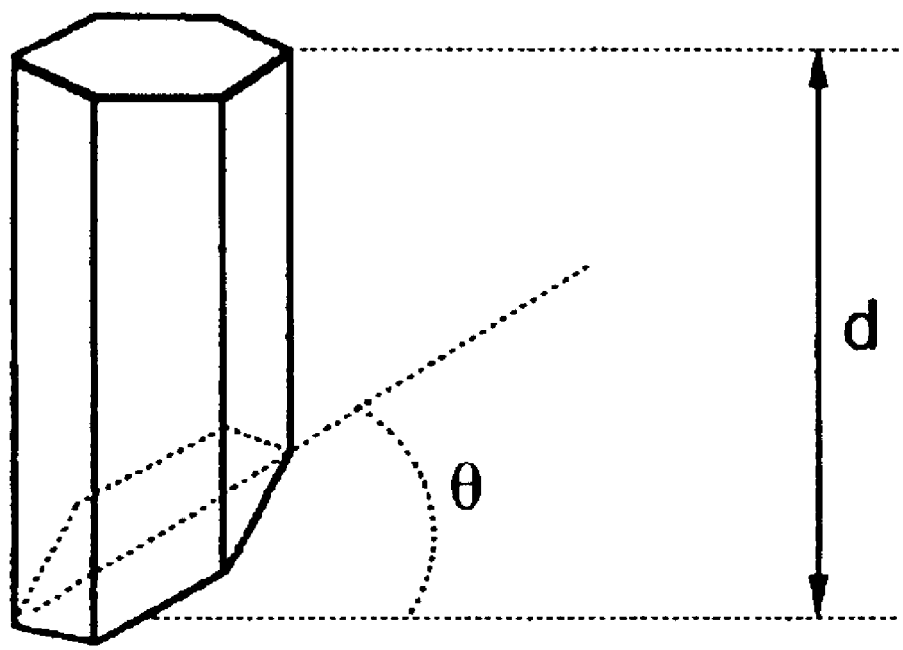
FIG. 13 is a view showing the form of a lens-like groove in the fourth embodiment of the present invention.

FIG. 13 is a view showing a substantially polygonal-cylindrical lens-like groove with a depth d, which has a taper angle θ at the end portion and a condensing effect.

Even a light guide member comprising the polygonal-cylindrical lens-like grooves as shown in FIG. 13 can obtain the effect equivalent to that in FIG. 12. Incident light from CCFLs 328 is reflected by a reflecting sheet 332, and emitted as a surface light source while being condensed by the lens-like grooves shown in FIG. 13.

Note that, in accordance with the positions of light sources and size of the light guide member, the taper angle θ, depth d, direction of the taper angle, and positions of the grooves can be freely set. Hence, a more preferable pattern can be designed as compared with the conventional shape of triangular grooves, and even incident light beams from infrared LED arrays 329 can be used at high efficiency. Therefore, in the image reading apparatus having the transparent original light source unit in this embodiment, the uniformities of the light amount distributions as the surface light source for reading the original and the surface light source for detecting dust or scratch can be implemented at high efficiency. Hence, the light-emitting surface can emit light at high luminance and high power, and the image reading apparatus having the dust/scratch removing function at high speed and high resolution can be implemented.

(Fifth Embodiment)

Figure 14:
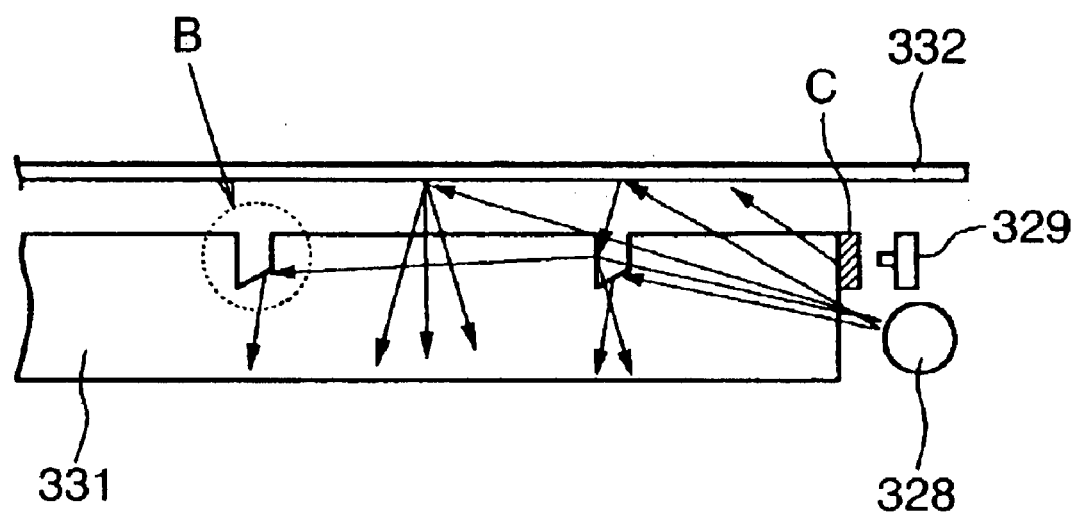
FIG. 14 is a view for explaining a luminous efficiency in the fifth embodiment of the present invention.

FIG. 14 is a view corresponding to FIG. 12 described above. As described above, an LED 329 is arranged at a position outside a CCFL 328. In FIG. 12, a transparent original light source unit 304 includes CCFLs 328 serving as the second light sources for reading the image information of a film original, and infrared LED arrays 329 serving as the first light sources. The pair of the first and second light sources are juxtaposed on each of the end faces, and a diffusion means 332 is arranged for diffusing light from the LED array 329. For example, ground glass is used as the diffusion means 332 or a diffusion tape is adhered as the diffusion means 332. In this embodiment, the second light source includes a fluorescent member, and emits light in the longitudinal direction. On the other hand, the first light source has a plurality of light-emitting surfaces in the longitudinal direction. Therefore, in the first light source, light-emitting surfaces 327 are intermittently arranged in correspondence with the second light source, and the area of the light-emitting surfaces is smaller than that of the second light source. Therefore, the first and second light sources have different spectral characteristics in the longitudinal direction. These spectral characteristics are then corrected. Note that, in FIG. 12, the pair of the LED array 329 and CCFL 328 are juxtaposed on the same end face. However, the present invention is not limited to this. For example, the LED array 329 and the CCFL 328 may be respectively arranged on the sides adjacent to each other, or the LED arrays 329 or the CCFLs 328 may be juxtaposed on the sides adjacent to each other.

As described above, according to the third to fifth embodiments, the incident light beams from both the first and second light sources can be emitted at high efficiency, thereby implementing high luminance and high power.

The uniform surface light source can be formed, thereby implementing the image reading apparatus with the dust/scratch removing function at high speed and high resolution.

The present invention is not limited to the above embodiments and various changes and modifications can be made within the spirit and scope of the present invention. Therefore, to apprise the public of the scope of the present invention the following claims are made.

What is claimed is:

1. An illumination apparatus comprising:
   a first light source which emits light in a visible range;
   a second light source which emits light in an invisible range; and
   a transparent light guide plate to which light beams emitted from said first and second light sources enter through a side surface of said light guide plate and which emits light coming from said first and second light sources uniformly from an effective light-emitting region which is a region of a front surface of said light guide plate where a part of the front surface existing near to said first and second light sources is excluded,
   wherein a distance between the effective light-emitting region of said light guide plate and an arrangement portion of said first light source is different from a distance between the effective light-emitting region and an arrangement portion of said second light source.

2. The apparatus according to claim 1, wherein the distance between the effective light-emitting region and the arrangement portion of said second light source is longer than the distance between the effective light-emitting region and the arrangement portion of said first light source.

3. The apparatus according to claim 2, wherein said second light source has a plurality of point light sources arranged on a straight line, and the plurality of point light sources are driven simultaneously.

4. The apparatus according to claim 1, wherein a first reflecting surface which reflects irradiation light from said second light source into said light guide plate is arranged in the arrangement portion of said second light source.

5. The apparatus according to claim 1, wherein said first and second light sources are juxtaposed along one side of said light guide plate.

6. The apparatus according to claim 5, wherein a second reflecting surface is arranged between the arrangement portions of said first and second light sources.

7. The apparatus according to claim 1, wherein said second light source emits light in an infrared range.

8. An image reading apparatus comprising an illumination apparatus defined in claim 1 and a reading device which makes light from an original illuminated by light which is emitted by said illumination apparatus enter an image sensing element, and converts the light into an image signal.

9. The apparatus according to claim 8, comprising a defect information reading device in which defect information present on an optical path extending from said light guide plate to an image sensing element is read on the basis of the image signal obtained when the light from the original illuminated by the light which is emitted by said second light source and guided by said light guide plate enters the image sensing element.

10. The apparatus according to claim 9, comprising a correction device which removes the defect information read by said defect information reading device from the image information read by said reading device.

11. The apparatus according to claim 9, wherein the defect information is information generated when dust or scratch present on the original itself shields light which is emitted from said second light source and guided by said light guide plate.

12. An illumination apparatus comprising:
a first light source which emits light in a visible range;
a second light source which emits light in an invisible range; and
a transparent light guide plate to which light beams emitted from said first and second light sources enter through a side surface of said light guide plate and which emits light coming from said first and second light sources uniformly from an effective light-emitting region which is a region of a front surface of said light guide plate where a part of the front surface existing near to said first and second light sources is excluded,
wherein a first reflecting surface which reflects irradiation light from said second light source into said light guide plate is arranged in the arrangement portion of said second light source.

13. The apparatus according to claim 12, wherein said first and second light sources are juxtaposed along one side of said light guide plate.

14. The apparatus according to claim 12, wherein a second reflecting surface is arranged between the arrangement portions of said first and second light sources.

15. The apparatus according to claim 12, wherein said second light source emits light in an infrared range.

16. An image reading apparatus comprising an illumination apparatus defined in claim 12 and a reading device which makes light from an original illuminated by light which is emitted by said illumination apparatus enter an image sensing element, and converts the light into an image signal.

17. The apparatus according to claim 16, comprising a defect information reading device in which defect information present on an optical path extending from said light guide plate to an image sensing element is read on the basis of the image signal obtained when the light from the original illuminated by the light which is emitted by said second light source and guided by said light guide plate enters the image sensing element.

18. The apparatus according to claim 17, comprising a correction device which removes the defect information read by said defect information reading device from the image information read by said reading device.

19. The apparatus according to claim 17, wherein the defect information is information generated when dust or scratch present on the original itself shields light which is emitted from said second light source and guided by said light guide plate.

20. An illumination apparatus comprising:
a first light source which emits light in a visible range;
a second light source which emits light in an invisible range; and
a transparent light guide plate to which light beams emitted from said first and second light sources enter through a side surface of said light guide plate and which emits light coming from said first and second light sources uniformly from an effective light-emitting region which is a region of a front surface of said light guide plate where a part of the front surface existing near to said first and second light sources is excluded,
wherein said first and second light sources are juxtaposed along one side of said light guide plate, and a reflecting surface is arranged between the arrangement portions of said first and second light sources.

21. The apparatus according to claim 20, wherein said second light source emits light in an infrared range.

22. An image reading apparatus comprising an illumination apparatus defined in claim 20, and a reading device which makes light from an original illuminated by light which is emitted by said illumination apparatus enter an image sensing element, and converts the light into an image signal.

23. The apparatus according to claim 22, comprising a defect information reading device in which defect information present on an optical path extending from said light guide plate to an image sensing element is read on the basis of the image signal obtained when the light from the original illuminated by the light which is emitted by said second light source and guided by said light guide plate enters the image sensing element.

24. The apparatus according to claim 23, comprising a correction device which removes the defect information read by said defect information reading device from the image information read by said reading device.

25. The apparatus according to claim 23, wherein the defect information is information generated when dust or scratch present on the original itself shields light which is emitted from said second light source and guided by said light guide plate.

26. An image reading apparatus including an original reading light source which illuminates an original, comprising:

a transparent light guide member which guides light from the light source to a light-emitting surface;

a light source arranged near a side surface facing a side of the light-emitting surface of said light guide member;

a substantially flat reflecting member arranged on the opposite surface of said light-emitting surface of said light guide member to reflect light from said light source into said light guide member, and an image reading device which reads an original image illuminated with light from said light source, wherein said light guide member has a plurality of substantially cylindrical holes to guide the light on the light-emitting surface of said light guide member.

27. The apparatus according to claim 26, wherein said light sources emit light of a first wavelength an light of a second wavelength different from the light of the first wavelength, and said image reading device reads first and second images respectively corresponding to illumination of the light of the first wavelength and the light of the second wavelength.

28. The apparatus according to claim 27, further comprising a signal processing device which removes dust or scratch from the first and second images.

29. The apparatus according to claim 26, wherein one of a depth and taper angle of the plurality of holes is changed in accordance with the distance from said light source.

30. The apparatus according to claim 26, wherein at least one of said light sources is one of an infrared LED, white LED, and visible light LED.

31. The apparatus according to claim 26, wherein at least one of said light sources is a light source for detecting a defect on the transparent original.

32. An illumination unit comprising:

a transparent light guide member which leads light to a light-emitting surface; and a plurality of cylindrical holes which are arranged in said light guide member, and have generating lines substantially extending in a direction perpendicular to the light-emitting surface, wherein the illumination unit includes first and second light sources with different characteristics, which are arranged on a side surface facing the light-emitting surface of said light guide member.

33. The unit according to claim 32, wherein the first and second light sources have spectral characteristics different from each other in the longitudinal direction.

34. The unit according to claim 32, wherein a diffusion device is arranged on an optical axis from one of said first and second light sources.

35. The unit according to claim 32, wherein at least one of the depth and taper angle of the plurality of holes is changed in accordance with the distance from said light source.

36. The unit according to claim 32, wherein said first light source includes a plurality of light-emitting portions, and is arranged at a position outside said second light source.

37. The unit according to claim 32, wherein said light guide member is substantially flat, in which a projecting portion is formed at an end portion, and said second light source is arranged in a recess portion formed by the projecting portion.

38. The unit according to claim 32, wherein said first and second light sources are respectively arranged on opposing surfaces of said light guide member.

39. The unit according to claim 32, wherein an area of the light-emitting surface of said second light source is larger than that of said first light source.

* * * * *